United States Patent Office 3,457,867
Patented July 29, 1969

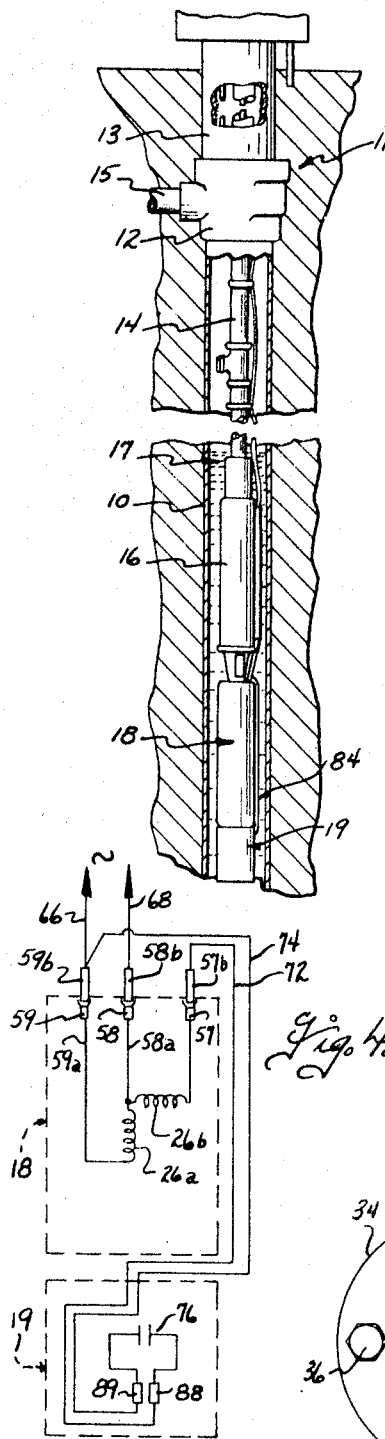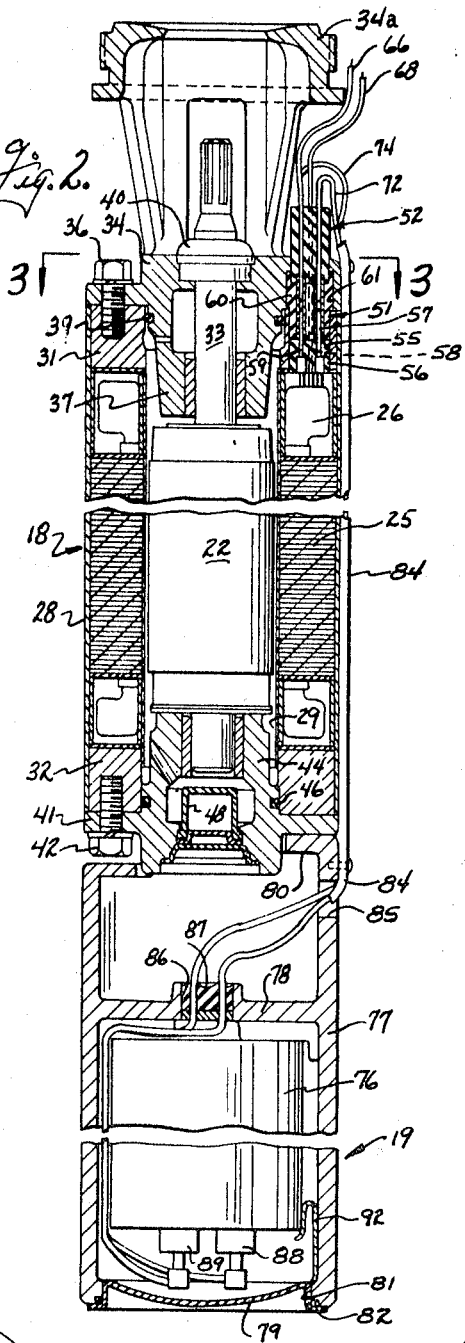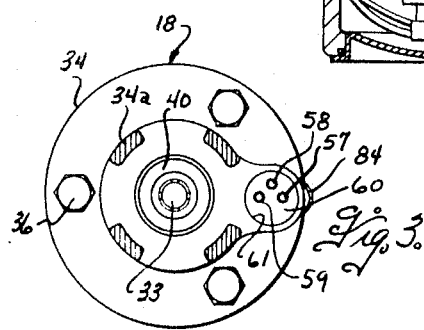

3,457,867
FLUID PUMPING SYSTEM
Peter S. Komor, Davenport, and Elmer M. Deters, Muscatine, Iowa, assignors to Red Jacket Manufacturing Company, Davenport, Iowa, a corporation of Iowa
Filed Jan. 25, 1968, Ser. No. 700,517
Int. Cl. F04d *13/02;* H02k *5/10, 5/12*
U.S. Cl. 103—87          6 Claims

ABSTRACT OF THE DISCLOSURE

A well casing extends to ground level and has a pump and a submersible single-phase induction motor therein. The motor has main and start windings connected to a three-lead connector at its upper end and has a capacitor unit mounted at its lower end. Four wires are connected to the three leads, two extending upwardly to a power source and two extending downwardly, outside the motor, and connected to the motor capacitor.

BACKGROUND

The invention pertains to fluid supply systems of the type including a pump and a submersible electric motor in a casing, such as a well casing.

Single-phase induction motors having main and start windings and three leads to the windings, are commonly used in submersible motor units. It is also common to use a motor capacitor in the circuit to the start winding to shift the phase. In some installations, the motor capacitor has been located remote from the motor, as in an enclosure at the top of the well casing. Such installations require three wires in the well casing to supply power to the motor and to connect the motor capacitor in circuit. Motors used in such installations are commonly called three-wire motors.

To enable the use of only two wires in the well casing, it has heretofore been proposed to locate the motor capacitor at the motor and operate the motor as a permanent split capacitor type. In some installations, the motor capacitor was positioned within the sealed motor enclosure. This, obviously, requires a special motor construction. Motor capacitors in separate imperforate units have been utilized, such as illustrated in U.S. Patent No. 3,248,582. The construction illustrated in the aforementioned patent requires a special stator with plug receptacles at both upper and lower ends. Thus, both types require special constructions to adapt the motors for two-wire connection to the power supply. As a result, permanent split capacitor motors such as these have become known as two-wire motors.

Thus, different motor constructions (i.e., two-wire and three-wire motors) have been required for different installations, as described above. As a result, different motors must be manufactured, supplied, and stocked. It has not been possible to utilize one motor type for the different installations.

SUMMARY

The present invention relates to a fluid pumping system of the type including a pump and a submersible motor disposed in a casing, and more particularly including an ordinary three-wire, single-phase induction motor having a sealed housing and a three lead connector at the upper end of the housing, four external wires connected to the three lead connector—two extending to a source of supply and two extending downwardly past the motor housing, and a motor capacitor unit below the motor and connected to said two downwardly extending wires.

An important object of this invention is to provide a fluid pumping system of the type described in which an ordinary three-wire, single-phase induction motor is utilized with only two wires extending into the casing.

Another object of this invention is to provide a fluid pumping system which includes a submersible electric motor and a motor capacitor unit in which the motor capacitor can be readily removed and replaced without necessitating opening of the motor enclosure.

These, and other objects and advantages of the present invention, will become apparent as the same becomes better understood from the following detailed description when taken in conjunction with the accompanying drawings.

DRAWING

FIGURE 1 is a fragmentary vertical sectional view through a well which incorporates the fluid pumping system of the present invention;

FIG. 2 is a vertical sectional view through the motor and the capacitor unit;

FIG. 3 is a view taken generally along line 3—3 of FIG. 2 and with the plug-in connector removed; and FIG. 4 is a diagrammatic view illustrating the electrical circuit utilized in the present invention.

DESCRIPTION

Reference is now made particularly to the drawings which illustrate the best presently known mode of carrying out the invention and wherein similar reference characters indicate the same parts throughout the several views.

In FIG. 1, the invention is shown as applied to a well which has a well casing extending from a point above the ground downwardly into the well opening in accordance with standard practice in encasing wells. As shown, the well casing includes a conventional casing tube 10 which normally extends downwardly to the aquifer or is terminated in a well screen (not shown). The upper end of the casing tube 10 may terminate at a point below the frost level in the ground. Attached to the upper end of the casing tube in a water-tight manner is a pitless underground unit, generally designated 11, which customarily includes a discharge head 12 and a casing extension 13 which extends to a point above the ground level. The discharge head 12 is preferably of the type having a removable packer unit (not shown) and which packer unit spans the discharge head and communicates a downwardly extending drop pipe 14 with a lateral discharge pipe 15 on the discharge head 12. The drop pipe 14 extends downwardly in the casing to a pump unit 16 submerged in a fluid such as water, generally designated by the numeral 17. A submersible electric motor 18 is attached to the pump 16 to drive the same and, in accordance with the present invention, a capacitor unit, generally designated 19, is located below the motor.

The submersible motor 18 is advantageously a single-phase induction motor of the so-called three-wire type which may be ordinarily used as a capacitor start, induction run motor. The motor 18 includes a stator and a rotor 22 disposed in the stator, as shown in FIG. 2. The stator is of the type commonly used in submersible induction motors and comprises a laminated core structure 25 having motor windings 26 which include main windings 26a and start windings 26b (see FIG. 4). The core and windings are disposed within an imperforate outer shell 28. The motor windings 26 are preferably sealed and, for this purpose, an inner tubular member or liner 29 is disposed within the core, and ring members 31 and 32 are provided at opposite ends of the stator and sealed to the outer shell 28 and to the liner 29 to form a sealed enclosure for the stator windings. The rotor 22, disposed in the stator, has a motor shaft 33 extending outwardly of the motor enclosure for connection to the pump 16. An upper end member 34 overlies the stator ring member 31 and is removably fastened by fasteners 36. The upper end member 34 conveniently includes a bearing hub 37 extending axially from one side of the end member into the rotor chamber and has an O-ring 39 which engages the ring member 31. A shaft seal 40 is provided on the motor end member to seal the inner face with the shaft 33. A fitting 34a is conveniently formed integrally with the upper end member 34 for attachment to the pump unit 16 to mount the motor unit thereon.

The lower end of the stator body is enclosed by an end member 41 which overlies the stator ring member 32 and is fastened thereto by a plurality of fasteners 42. The end member 41 extends into the ring member 32 and carries a bearing hub 44 for rotatably supporting the lower end of the shaft 33. The lower end member 41 is sealed to the ring member 32 as by an O-ring 46, thereby cooperating with the aforedescribed structure to provide an imperforate motor housing. Preferably, the chamber containing the rotor is filled with a fluid (not shown) having suitable lubricating characteristics. In order to accommodate thermal expansion and contraction of the fluid, a movable wall or expansion chamber 48 is mounted on the end member 41 and has one side exposed to the fluid in the rotor chamber.

A plug-in type electrical disconnect including first and second connector members, designated generally as 51 and 52, is provided on the upper end of the motor to enable connection of the capacitor unit 19 and the power supply to the stator windings 26a and 26b in the motor. The disconnect is mounted on the motor housing in sealed relation therewith and preferably in one limited area of the upper end, as shown in FIGS. 2 and 3. A bore 55 is formed in the ring member 31 and is spaced radially from the center of the stator. The first connector member 51 includes a first insulating body 56 mounted at the inner end of bore 55 and carrying electrical prongs 57, 58, and 59. Preferably, the main and start windings are connected to three leads 57a, 58a, and 59a which are connected to the prongs, as hereafter described. A second insulating body 60 is mounted in a stepped bore 61 in the end member 34 and carries three socket members each associated with one of the lead prongs 57–59. The insulating bodies may be formed of various suitable dielectric materials, and are advantageously formed of a resilient dielectric material such as rubber. As shown, the second body 60 terminates a substantial distance inwardly of the outer end of bore 61 to define a socket in the end member 34.

The second connector member or plug-in disconnect 52 includes a body of dielectric material and comprises a plug portion dimensioned to be received in the aforementioned socket defined by bore 61. Three metal prong connectors 57b–59b (see FIG. 4) are imbedded in the connector member 52 and are arranged to interfit with the three socket members to electrically connect the connectors 57b–59b with the lead prongs 57–59. While a particular plug-in disconnect construction has been illustrated and described, it is apparent that other constructions could be utilized, if desired. For example, the plug-in disconnect may be of the type illustrated in U.S. Patent No. 3,294,933.

In accordance with the present invention, four wires are connected to the three connectors 57b–59b of the second connector member 52. Supply wires 66 and 68 and third and fourth wires 72 and 74 are connected to the three connectors 57b–59b to provide electrical connection of the four wires to the motor windings 26 and a motor capacitor 76. Referring to FIG. 4, the windings, as previously described, include the main winding 26a and the start winding 26b. As shown, the main winding 26a has a main lead 59a connected to prong 59; start winding 26b has a start lead 57a connected to prong 57; and both windings have a common lead 58a connected to prong 58. As shown, supply wires 66 and 68 are connected to connectors 59b and 58b, respectively, to supply power to the main winding 26a. The start winding 26b is connected in series with the motor capacitor 76 by means of wires 72 and 74 operatively connected to connectors 57b and 59b, respectively. In this manner, the four external wires 66, 68, 72, and 74 are operatively connected to the three motor leads 57a–59a; with two of the wires, namely 66 and 74, being operatively connected to the main lead 59a.

The motor capacitor 76 is enclosed in a sealed case which is separate from the motor housing. The case is mounted at the lower end of the motor housing by means of fasteners (not shown). For example, the motor 18 may be provided with four fasteners 42 at its lower end. Two of these fasteners may be removed and replaced by two longer fasteners (not shown) which pass through a flange 80. The case is conveniently in the form of a casting having a generally annular configuration and including a side wall 77, an intermediate end wall 78, and a removable lower end wall 79 fitted in an opening 81 and sealed by means of an O-ring 82. Opening 81 is of sufficient size for insertion and removal of the motor capacitor 76 therethrough. Wires 72 and 74, as best shown in FIG. 2, extend downwardly outside of the motor housing and are preferably held closely adjacent thereto as by a guard 84 fastened at both ends and extending the length of the motor case. The wires 72 and 74 conveniently pass through an opening 85 into an unsealed portion of the casing and through another opening 86 in intermediate wall 78. Opening 86 is preferably sealed as by an epoxy 87 to provide a sealed portion of the casing for motor capacitor 76. Leads 72 and 74 conveniently extend into the capacitor chamber to a point adjacent the lower end thereof. Capacitor connectors 88 and 89 are provided adjacent the lower end of the chamber so that the lower end cover 79 may be removed, the wires 72 and 74 disconnected, and the motor capacitor 76 removed and replaced, if necessary, the capacitor 76 may be removably held in position as by a spring fastener 92, for example. The capacitor chamber can be partially filled with an inert insulating material (not shown) if desired.

From the foregoing, it is thought that the construction and operation of the device will be readily understood. The fluid supply unit includes a pump, a three-wire, single-phase induction motor having a three lead connector at its upper end, and a capacitor unit adjacent the motor. Four wires are connected to the three connectors, two of the wires extending upwardly through the casing for connection to a power source and two extending to the motor capacitor. Thus, only two power supply wires are required to connect the submerged motor to the power supply. Additionally, the motor capacitor is mounted externally of the motor housing and in a separate sealed enclosure in such a manner that the capacitor can be readily detached and removed from the motor.

Thus, the present invention makes it possible to convert a three-wire motor to a two-wire motor. For example, the usual three-wire, plug-in disconnect is not utilized. Instead, four wires are connected to the three connectors of the plug-in disconnect or second connector member 52. The capacitor case, having its motor capacitor 76 connected to wires 72 and 74, is mounted on the lower end of the motor. The guard 84 is then mounted to hold the wires 72 and 74 closely adjacent the motor shell 28. In this manner, an ordinary three-wire, single-phase induction motor can be utilized in an installation requiring only two wires extending into the well casing.

While a preferred embodiment of the invention has herein been illustrated and described, this has been done by way of illustration and not limitation, and the invention should not be limited except as required by the scope of the appended claims.

What is claimed is:

1. In a fluid pumping system including a casing containing fluid to be pumped, a delivery pipe in the casing and having an inlet adjacent its lower end, pump means in the casing having a discharge connection to the delivery pipe inlet for pumping the fluid through the delivery pipe, the combination therewith of:

a submersible single-phase electric motor including a sealed housing having upper and lower ends, a stator in the motor housing and a rotor in the stator, a shaft on the rotor having a driving connection with the pump means, the stator having main and start windings, a main lead connected to the main winding, a start lead connected to the start winding, a common lead connected to both windings, said leads extending to the upper end of the motor housing, first and second wires operatively connected to the main and common leads respectively at the upper end of the motor housing and extending out of the casing to a source of electrical power, and third and fourth wires operatively connected to the main and start leads respectively at the upper end of the motor housing and extending downwardly past the motor housing outwardly thereof;

and a capacitor unit below the motor and including a case defining a sealed capacitor chamber, a motor capacitor in the capacitor chamber, and capacitor connecting means connected to the motor capacitor and to the third and fourth wires.

2. The combination of claim 1 wherein the leads include first disconnect means at the upper end of the motor housing in sealed relation therewith and in one limited area of said upper end, and wherein the wires include second disconnect means connected to the first disconnect means at the upper end of the motor for operatively connecting the four wires to the three leads.

3. The combination of claim 1 wherein: the motor capacitor is removably mounted in the capacitor chamber, the case has upper and lower ends and an opening at the lower end of sufficient size for insertion and removal of the motor capacitor therethrough, the case includes a removable sealing cover overlying said opening, the third and fourth wires extend into the capacitor chamber, and the capacitor connecting means are located adjacent the lower end of the capacitor chamber, whereby the cover may be removed, the wires disconnected, and the motor capacitor removed and replaced.

4. The combination of claim 1 including means for mounting the capacitor unit on the motor housing at the bottom thereof, and means for holding the third and fourth wires closely adjacent the outside of the motor housing.

5. The combination of claim 1 including means for mounting the capacitor unit on the motor housing at the bottom thereof, and means for holding the third and fourth wires closely adjacent the outside of the motor housing; and wherein: the leads include first disconnect means at the upper end of the motor housing in sealed relation therewith and in one limited area of the upper end, the wires include second disconnect means connected to the first disconnect means at the upper end of the motor housing for connecting the four wires to the three leads, the motor capacitor is removably mounted in the capacitor chamber, the case has upper and lower ends and an opening at the lower end of sufficient size for insertion and removal of the motor capacitor therethrough, the case includes a removable sealing cover overlying said opening, the third and fourth wires extend into the capacitor chamber, and the capacitor connecting means are located adjacent the opening, whereby the cover may be removed, the wires disconnected, and the motor capacitor removed and replaced.

6. In a fluid pumping system including a casing containing fluid to be pumped, a delivery pipe in the casing and having an inlet adjacent its lower end, pump means in the casing having a discharge connection to the delivery pipe inlet for pumping the fluid through the delivery pipe, the combination therewith of:

a submersible single-phase induction motor including a sealed housing having upper and lower ends, a stator in the motor housing and a rotor in the stator, a shaft on the rotor having a driving connection with the pump means, the stator having main and start windings, a main lead connected to the main winding, a start lead connected to the start winding, a common lead connected to both windings, a first connector member at the upper end of the motor housing and having a first set of three connector elements thereon, each connector element being operatively connected to one of said leads, a second connector member having a second set of three connector elements interfitting with the connector elements of the first set, three wires each connected to one of the connector elements of the second set to operatively connect the three wires to the three leads, a fourth wire also connected to the connector element which is operatively connected to the main lead, whereby the connector members connect four wires to the three leads, a motor capacitor mounted adjacent the motor and operatively connected to the fourth wire and the wire leading to thet start lead, and said other two wires extending out of the casing to a source of electrical power.

References Cited

UNITED STATES PATENTS 2,002,916   5/1935   Mendenhall et al. _____ 310—87
3,248,582   4/1966   Brown _____ 310—87

ROBERT M. WALKER, Primary Examiner

U.S. Cl. X.R.
310—68, 87